United States Patent [19]
Fischer et al.

[11] Patent Number: 5,889,772
[45] Date of Patent: Mar. 30, 1999

[54] SYSTEM AND METHOD FOR MONITORING PERFORMANCE OF WIRELESS LAN AND DYNAMICALLY ADJUSTING ITS OPERATING PARAMETERS

[75] Inventors: Matthew J. Fischer, Mountain View; William F. Kern, Palo Alto, both of Calif.

[73] Assignee: Advanced Micro Devices, Inc., Sunnyvale, Calif.

[21] Appl. No.: 839,836

[22] Filed: Apr. 17, 1997

[51] Int. Cl.[6] ............................................ H04J 3/16
[52] U.S. Cl. ................................ 370/346; 371/32
[58] Field of Search ......................... 370/315, 322, 370/328, 332, 348, 346, 349, 373, 414, 416, 910, 431, 437, 443; 455/54, 58, 69

[56] References Cited

U.S. PATENT DOCUMENTS

| | | |
|---|---|---|
| 5,231,634 | 7/1993 | Giles et al. . |
| 5,440,545 | 8/1995 | Buchholz et al. ........................ 370/315 |
| 5,555,266 | 9/1996 | Buchholz et al. ........................ 370/322 |
| 5,560,021 | 9/1996 | Vook et al. ................................ 395/750 |
| 5,654,968 | 8/1997 | Smiroldo .................................. 370/443 |

*Primary Examiner*—Ajit Patel
*Assistant Examiner*—Chi ho Andrew Lee

[57] ABSTRACT

A station in the WLAN monitors each transmitted frame to determine whether the frame transmission was protected by an existing outstanding airtime reservation. If a frame is transmitted without an airtime reservation and no response frame is received, the station assumes that the transmission failed due to contention, and monitors the number of contention attempts made to transmit each frame, and the number of failures to receive an acknowledgement. Based on this information, the station dynamically adjusts an RTS/CTS threshold used to determine whether or not an RTS/CTS exchange mechanism should be enabled. If a frame is transmitted during a time interval protected by an outstanding airtime reservation and no response frame is received, the station assumes that the transmission failed due to a bit error, and monitors the number of bit error rate (BER) attempts made to transmit each frame, and the number of BER failures to receive an acknowledgement. Based on this information, the station dynamically adjusts a fragmentation threshold used to determine whether or not a data frame fragmentation mechanism should be enabled.

14 Claims, 4 Drawing Sheets

SYSTEM AND METHOD FOR MONITORING PERFORMANCE OF WIRELESS LAN AND DYNAMICALLY ADJUSTING ITS OPERATING PARAMETERS

TECHNICAL FIELD

The present invention relates to wireless data communications, and more particularly, to a system that monitors performance of a wireless local area network (WLAN) to dynamically adjust its operating parameters.

BACKGROUND ART

In a WLAN, wireless communication links are used as a transmission medium to exchange data between various stations. Due to the nature of wireless communications, it is difficult to physically detect a collision event when multiple stations transmit data frames at the same time. As a result, a typical WLAN protocol requires each frame transmission to be acknowledged by the receiver. In response to a received DATA frame, the receiver transmits an acknowledgement (ACK) frame, which indicates to the original transmitter that the DATA frame was received without errors. Accordingly, the transmitter assumes that no significant collision event happened during the DATA frame transmission. If the ACK frame is not received, the transmitter assumes that some collision event causes the DATA frame to be lost.

Figure 1:
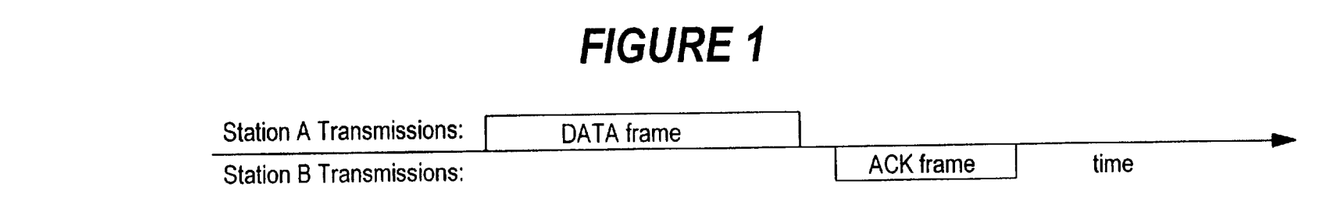
FIGS. 1–3 illustrates various events during data transmission from Station A to Station B.
Figure 2:
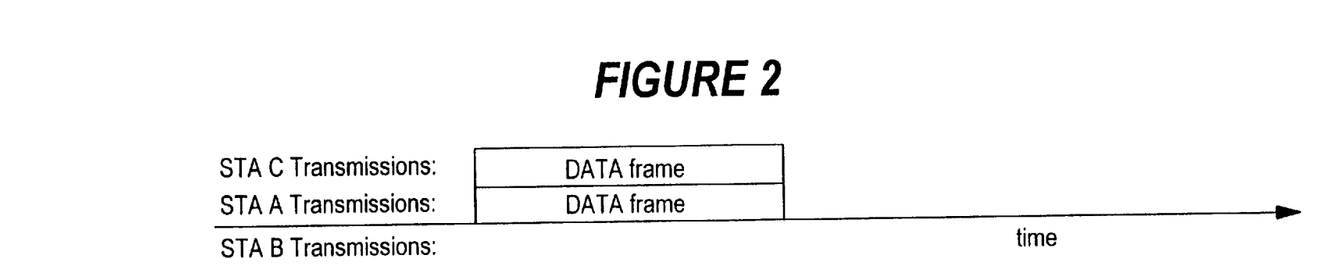

FIG. 1 illustrates the successful transmission of a DATA frame from Station A to Station B that acknowledges the reception by sending an ACK frame. FIG. 2 illustrates a collision event caused by simultaneous transmission of DATA frames by Station A and Station C. As a result, Station B does not receive data. Station A and Station C will assume that a collision has taken place because neither of them will receive an ACK frame from their intended receivers.

Figure 3:
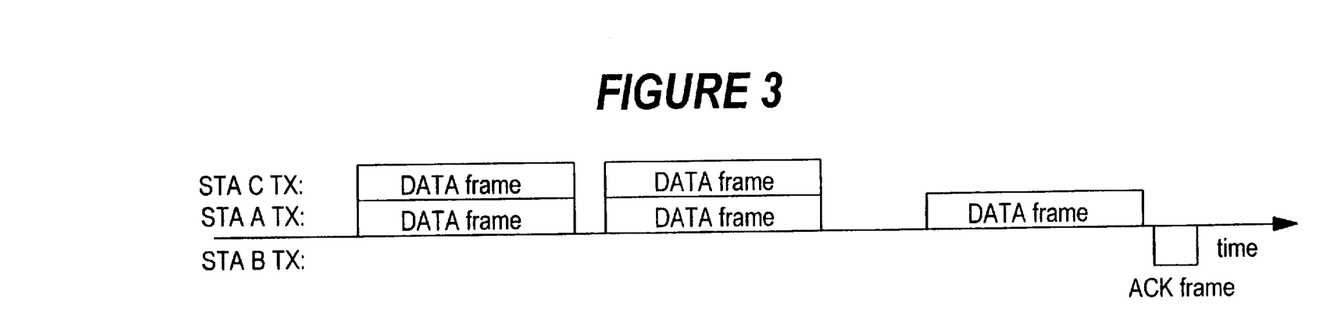

As shown in FIG. 3, Station A may retry to send its DATA frame to Station B. However, a collision with a DATA frame from Station C may again prevent Station B from receiving information. As no acknowledgement is sent, Station A must repeat its DATA frame again. This transmission may be successful, and Station B responds with an ACK frame.

A collision event caused by multiple stations competing for a shared network usually occurs at the beginning of transmission. Because the Medium Access Protocol indicates to stations on the network that the medium is free at approximately the same time, any stations with pending transmissions will begin to transmit at approximately the same time. When this occurs, the resulting transmissions will have a collision event that physically begins at or near the beginning of the transmission. However, the transmitting device is unaware of the occurrence of the collision until it has completed its attempt to transmit the DATA frame, and does not receive the expected ACK frame.

Thus, the collision event cannot be detected until the end of the transmission attempt. The longer the DATA frame, the longer it will take for the transmitting station to determine that the collision event has occurred.

Furthermore, if a collision event occurs at or near the beginning of a long DATA frame, most protocols and physical implementations render the entire DATA frame unreceivable. Therefore, the portion of the DATA frame after the beginning of the collision event wastes network bandwidth. The sooner a collision can be detected by a transmitter, the sooner the transmitter can end the faulted transmission and stop wasting network bandwidth.

To minimize the probability of a collision, some WLANs use a short request-to-send (RTS) frame sent before the actual data transmission to request an airtime reservation. For example, U.S. Pat. No. 5,231,634 to Giles et al. discloses an RTS frame sent by a transmitting station to inform other WLAN stations that the sending station wishes to use the medium for a data transmission. The RTS frame contains a time duration field which indicates to all receiving stations the amount of airtime requested for a data transmission. The requested airtime corresponds to the amount of time required to send the DATA frame plus the time required to send the ACK frame, plus the time required to receive an acknowledgement for the airtime reservation request, plus some additional small amount of time required to provide interframe spacing.

As the RTS frame itself may encounter a collision, an acknowledgement for the RTS frame is sent by a receiving station. A clear-to-send (CTS) frame may be sent in response to the RTS frame to confirm the airtime reservation. The CTS frame repeats the airtime reservation duration information.

Thus, when an RTS/CTS frame exchange mechanism is used, the following sequence of events takes place: the transmission of the RTS frame by transmitting Station A to request an airtime reservation, the transmission of the CTS frame by receiving Station B to provide an airtime reservation confirmation, the transmission of the DATA frame by Station A, and then the transmission of the ACK frame by station B to acknowledge the reception of the DATA frame.

Figure 4:
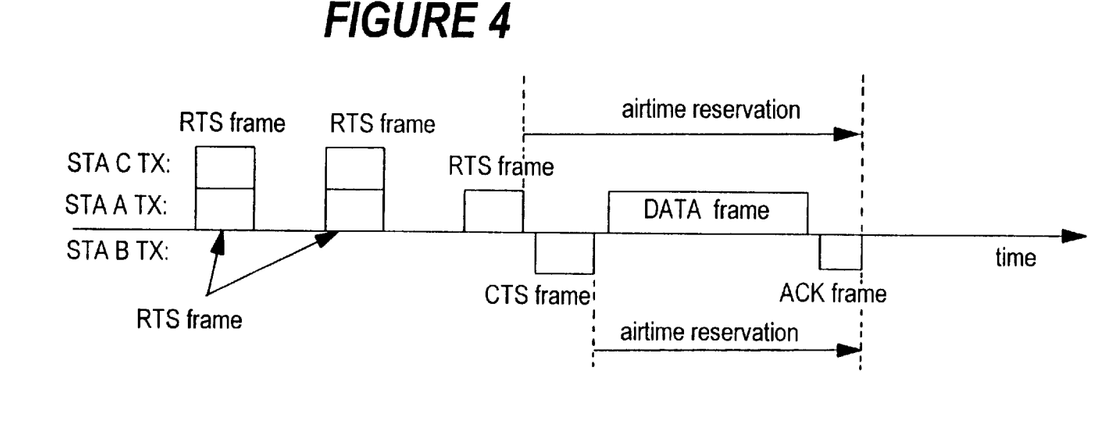
FIG. 4 illustrates an RTS/CTS exchange mechanism.

If this frame exchange encounters a collision, it should normally occur at or near the beginning of the exchange, i.e. during the RTS or CTS frame transmission. For example, FIG. 4 illustrates two transmission attempts when the RTS frames sent from Station A were not received by Station B because of collisions with data simultaneously sent by Station C. However, the third RTS frame from Station A is received by Station B, which responds with the CTS frame. After receiving the CTS frame, Station A transmits its DATA frame acknowledged by the ACK frame sent by Station B. The airtime reservation requested by Station A and confirmed by Station B provides a time interval for the transmission of the DATA frame and ACK frame.

As the RTS and CTS frames are made short, a collision that occurs during the transmission of either of these frames results in stopping the transmission after a short time interval. Thus, the RTS/CTS frame exchange mechanism prevents network bandwidth from being wasted. Once the RTS/CTS exchange is successful, the airtime reservation information contained in the RTS and CTS frames is used by other stations in the network to avoid transmitting data during the requested airtime reservation interval. As a result, the DATA frame and ACK frame transmissions can proceed with greatly reduced possibility of encountering a collision event.

It should be noted that the RTS/CTS frame exchange mechanism requires that some of the network bandwidth be sacrificed. In a WLAN having many competing stations, the bandwidth lost to RTS/CTS frame exchanges is more than made up for by the reduction in wasted bandwidth that would have occurred due to collisions during long DATA frame transmissions. However, when the number of competing stations in the WLAN is small, the relatively infrequent long DATA frame losses due to collisions may amount to less overall network bandwidth loss than the loss due to the inclusion of the RTS/CTS frame exchange which preceded each DATA frame.

Therefore, some WLANs use a RTS/CTS threshold that specifies the minimum length of a DATA frame for which the RTS/CTS frame exchange mechanism is used. If the length of a DATA frame queued for transmission exceeds that minimum length, then RTS/CTS frame exchange is enabled for that frame transmission, otherwise the RTS/CTS exchange mechanism is not used.

In the event of the failure of a transmitting station to receive an acknowledgment frame (i.e. a CTS frame or an ACK frame), the transmitting station assumes that a collision took place. However, the transmission failure may be caused, for example, by a noise-induced bit error, or by some other interference source such as a non-WLAN transmitter. Also, the intended recipient may be out of the range of the transmitting station.

In the case of a bit error due to noise, the bit-error rate (BER) of the system is relatively fixed for a given signal/noise ratio. As this ratio changes, the BER may increase or decrease. Because of the fluid nature of the radio environment, the noise (and hence the signal/noise ratio) is constantly changing. When the a noise increases, the probability that a frame transmission experiences an error will increase.

Because of the presence of a changing noise factor, many WLANs employ yet another mechanism intended to improve their performance. That mechanism is the ability to fragment frames.

Figure 5:
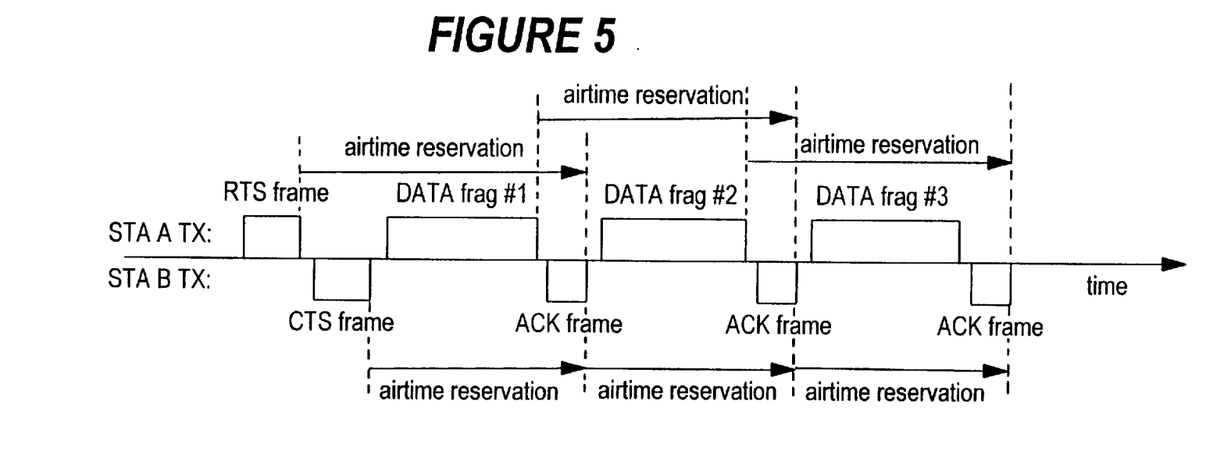
FIG. 5 illustrates a data fragmentation scheme.

As illustrated in FIG. 5, before transmission, a larger DATA frame may be divided into smaller DATA frames sent one at a time. The receiver must re-assemble the smaller DATA frames back into the original DATA frame. Each of the smaller DATA frames is called a DATA fragment. The reason that network throughput is improved when fragmenting is performed is that when the BER is high, a long DATA frame will have a greater probability of containing at least one error. In most WLAN systems, there is no recovery from the presence of even a single bit error, and hence, the entire DATA frame must be ignored, no ACK frame will be generated by the recipient, and the transmitter must assume that a collision has taken place and it will backoff and reschedule the DATA frame transmission attempt. The unsuccessful DATA frame transmission represents lost network bandwidth. In addition, it is likely that the long DATA frame may encounter a single bit error on successive attempts, and even more bandwidth is lost.

If a DATA frame is divided into smaller fragments, only one of the fragments will contain a single bit error, and only this fragment will need to be retransmitted. Therefore, the lost network bandwidth is substantially reduced.

In the case of DATA frame fragmentation, each DATA fragment sent by transmitting Station A is acknowledged by an ACK frame produced by receiving Station B. Each DATA fragment and ACK frame contain airtime reservation duration information, which allows the station sending the DATA frame fragments to prevent other stations from data transmission during the indicated airtime reservation interval.

The DATA frame fragmentation may be used together with the RTS/CTS exchange mechanism. The possible frame exchange illustrated in FIG. 5 may consist of the RTS frame acknowledged by the CTS frame, DATA fragment #1 acknowledged by the ACK frame, DATA fragment #2 acknowledged by the ACK frame, DATA fragment #3 acknowledged by the ACK frame, etc.

The total time required to transmit a fragmented DATA frame is greater than the time required to sent a single long DATA frame, because each DATA fragment contains headers and trailer representing its physical layer and its medium access control protocol layer. Moreover, each DATA fragment is individually acknowledged, and interframe spaces exist between each fragment and ACK frame.

However, if a long DATA frame had a reasonable probability of being retransmitted, then the total time required to perform the multiple transmission attempts of the single long DATA frame could be larger than the total time required for transmission of all of the shorter DATA fragments including the additional overhead, the additional ACK frames, and the interframe spaces, even if some of the DATA fragments were retransmitted.

A typical WLAN has the ability to set a fragmentation threshold equal to the minimum length of a DATA frame subject to fragmentation. Any DATA frame having length that exceeds this fragmentation threshold is divided into fragments having length less than the fragmentation threshold.

Thus, it would be desirable to dynamically adjust the RTS/CTS and fragmentation thresholds to provide the highest possible WLAN throughput for the current operating conditions.

Also, it would be desirable to monitor WLAN parameters used for adjusting the RTS/CTS and fragmentation thresholds to maximize the WLAN throughput for the current operating conditions.

DISCLOSURE OF THE INVENTION

Accordingly, one advantage of the invention is in providing a system for dynamically adjusting RTS/CTS and fragmentation thresholds to provide the highest possible WLAN throughput for the current operating conditions.

Another advantage of the invention is in providing a system that monitors WLAN parameters used for adjusting the RTS/CTS and fragmentation thresholds to maximize the WLAN throughput for the current operating conditions.

The above and other advantages of the invention are achieved, at least in part, by providing a WLAN controller comprising a data processing unit that produces frames to be transmitted to a destination station and checks acknowledgements indicating that the frames are received by the destination station. A control unit is coupled to the data processing unit for monitoring the number of attempts made to transmit each frame and the number of failures to receive an acknowledgement in response to transmission of the frame, in order to dynamically control transmission of airtime reservation requests sent to the destination station.

Moreover, the control unit may dynamically control god fragmentation of data frames sent to the destination station.

In accordance with one aspect of the invention, the control unit determines whether an airtime reservation is provided for transmission of each of the frames, and dynamically adjusts a threshold level for transmission of the airtime reservation requests to the destination station, based on the number of attempts made to transmit a frame to the destination station and the number of failures to receive an acknowledgement, when the airtime reservation is not provided for transmission of the frame.

In accordance with another aspect of the invention, the control unit dynamically adjusts a threshold level for fragmentation of the data frames transmitted to the destination station, based on the number of attempts made to transmit a frame to the destination station and the number of failures to receive an acknowledgement, when the airtime reservation is provided for transmission of the frame.

In accordance with a further aspect of the invention, the control unit determines the average number of attempts made to transmit the frames to destination stations and the average number of failures to receive an acknowledgement for the WLAN, to determine deviation of operating conditions for each of the destination stations from average operating conditions for the WLAN. A queuing unit may be used to control priorities of the frames sent to a destination station in accordance with the deviation of the operating conditions for the destination station from the average operating conditions for the WLAN.

In accordance with a method of the present invention the following steps are carried out to dynamically adjust operating parameters of a WLAN:

monitoring transmission of each frame to destination stations in the WLAN, checking whether or not an airtime reservation is obtained for protecting transmission of each frame, monitoring whether an acknowledgement is received in response to each transmitted frame, for each destination address of the WLAN, maintaining a count of contention attempts indicative of the number of attempts to transmit the frame to each destination station when no airtime reservation is available, for each destination address of the WLAN, maintaining a count of contention failures indicative of the number of failures to receive the acknowledgement when no airtime reservation is available, for each destination address of the WLAN, producing an airtime reservation threshold level for transmitting an airtime reservation request before a data frame if a parameter of the data frame exceeds the airtime reservation threshold level, incrementing the count of contention attempts for a first destination address each time when a frame unprotected by the airtime reservation is transmitted to a first destination station corresponding to the first destination address, incrementing the count of contention failures for the first destination address each time when no acknowledgement is received in response to the unprotected frame, and for the first destination address, adjusting the airtime reservation threshold level in accordance with the ratio of the incremented count of contention failures to the incremented count of contention attempts.

In accordance with a further aspect of the present invention, the following steps may be carried out:

for each destination address of the WLAN, maintaining a count of protected attempts indicative of the number of attempts to transmit the frame to each destination station when the airtime reservation is available, for each destination address of the WLAN, maintaining a count of protected failures indicative of the number of failures to receive the acknowledgement when the airtime reservation is available, for each destination address of the WLAN, producing a fragmentation threshold level for fragmenting a data frame if a parameter of the data frame exceeds the fragmentation threshold level, incrementing the count of protected attempts for the first destination address each time when a frame protected by the airtime reservation is transmitted to the first destination station corresponding to the first destination address, incrementing the count of protected failures for the first destination address each time when no acknowledgement is received in response to the protected frame, and adjusting the fragmentation threshold level for providing fragmentation of data frames to be transmitted to the first destination station in accordance with the ratio of the incremented count of protected failures to the incremented count of protected attempts.

In accordance with another aspect of the invention, an average count of contention attempts and an average count of contention failures for the WLAN may be determined. The average counts may be modified based on the incremented counts of contention attempts and contention failures. An average airtime reservation threshold level for the WLAN may be adjusted in accordance with the ratio of the modified average count of contention failures to the modified average count of contention attempts.

The adjusted airtime reservation threshold level for the first destination address may be compared with the adjusted average airtime reservation threshold level to control priority of a frame to be sent to the first destination station.

Furthermore, an average count of protected attempts and an average count of protected failures for the WLAN may be determined. These average counts may be modified based on the incremented counts of protected attempts and protected failures. An average fragmentation threshold level for the WLAN may be adjusted in accordance with the ratio of the modified average count of protected failures to the modified average count of protected attempts.

The adjusted fragmentation threshold level for the first destination address may be compared with the adjusted average fragmentation threshold level to control priority of a frame to be sent to the first destination station.

In accordance with another aspect of the invention, a controller for a wireless communication station may comprise:

first means for monitoring transmission of frames to destination stations, second means for determining whether or not an airtime reservation is obtained for protecting transmission of the frames, third means for determining whether acknowledgements are received in response to the transmitted frames, fourth means responsive to the first, second and third means for maintaining a count of protected attempts indicative of the number of attempts to transmit the frames to the destination station when the airtime reservation is available, fifth means responsive to the first, second and third means for maintaining a count of protected failures indicative of the number of failures to receive the acknowledgements when the airtime reservation is available, and first control means responsive to the fourth and fifth means for controlling fragmentation of data to be transmitted to the destination stations.

The controller may further comprise:

sixth means responsive to the first, second and third means for maintaining a count of unprotected attempts indicative of the number of attempts to transmit the frames to the destination station when no airtime reservation is available, seventh means responsive to the first, second and third means for maintaining a count of unprotected failures indicative of the number of failures to receive the acknowledgements when no airtime reservation is available, and second control means responsive to the sixth and seventh means for enabling airtime reservation requests before transmitting the data to the destination stations.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 6:
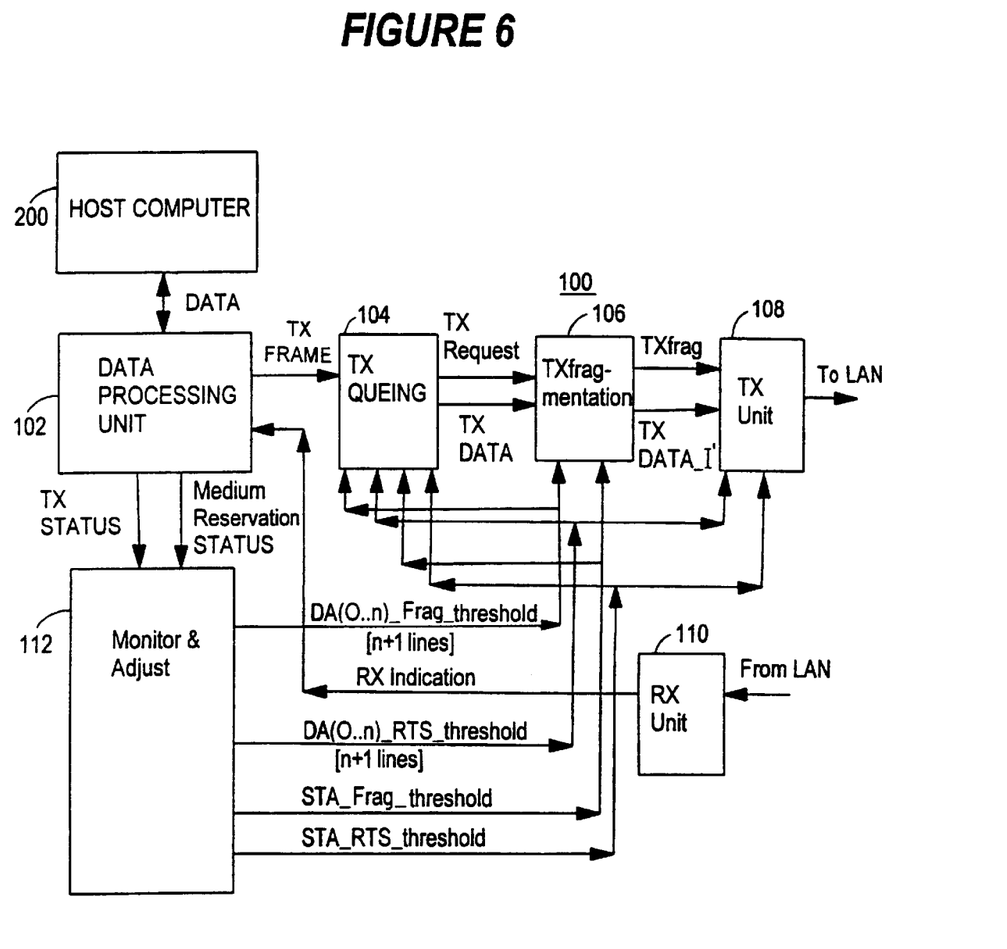
FIG. 6 is a simplified block diagram of the WLAN controller in accordance with the present invention.

Although the invention has general applicability in the field of wireless data communications, the best mode for practicing the invention is disclosed based on an exemplary WLAN controller 100 illustrated in FIG. 6.

The WLAN controller 100 may be provided in each station incorporated in a WLAN with distributed or centralized architecture. The WLAN controller 100 may comprise a data processing unit 102 connected with a local or remote host computer 200 that provides the data processing unit with data to be transmitted via the WLAN, and receives data incoming from the WLAN.

The data processing unit 102 may arrange data into a transmission (TX) frame formatted in accordance with protocol requirements of a specific WLAN and having a destination address (DA) that specifies the station or stations the frame is destined for. It can be a unique address of a destination station or a group of destination stations, or a global address for data broadcast.

TX frames may be sent to a TX queuing unit 104 that places them into a TX queue defining the order in which the TX frames will be sent to the WLAN. The TX queuing unit 104 may establish various priorities for frame transmission. Priorities can be assigned on a connection basis. For example, different priorities may be assigned to different DAs. As will be discussed in more detail later, the present invention allows priorities of DAs to be dynamically changed in accordance with current or anticipated WLAN conditions, such as data traffic, radio wave propagation conditions, and the current or anticipated location of a receiving station.

Additionally, priorities may be assigned on a message basis. For example, some categories of messages, such as control messages, may be assigned with a higher priority than other categories.

The TX queuing unit 104 may transfer frames to a TX fragmentation unit 106 that fragments DATA frames into smaller pieces. Any DATA frame that exceeds a fragmentation threshold is divided into DATA fragments (FIG. 5) to increase the WLAN throughput. As will be discussed later, the present invention allows the fragmentation threshold to be dynamically adjusted in accordance with current WLAN conditions.

TX frames including DATA fragments and DATA frames that do not require fragmentation are supplied to a TX unit 108 that provides wireless data transmission to a destination station in the WLAN.

As illustrated in FIG. 4, an exchange of request-to-sent (RTS) and clear-to-send (CTS) control frames may be used before the actual data transmission to provide airtime reservation. If the length of a DATA frame or DATA fragment queued for transmission exceeds an RTS/CTS threshold level, the TX unit 108 enables an RTS/CTS exchange mechanism that causes RTS frames to be sent before the transmission of that DATA frame or FATA fragment. As will be discussed in more detail later, the present invention allows the RTS/CTS threshold to be dynamically adjusted in accordance with current WLAN conditions.

A reception (RX) unit 110 is arranged for receiving data transmitted from other stations in the WLAN. In particular, the RX unit 110 receives a CTS frame sent by the destination station in response to an RTS frame to confirm the requested airtime reservation for the transmission of the DATA frame or DATA fragments following the RTS frame. Also, the RX unit 110 receives an ACK frame sent by the destination station to acknowledge that the transmitted DATA frame or DATA fragment is received.

The RX unit 110 provides the data processing unit 102 with an indication that the CTS and/or ACK frame is received. Based on this indication, the data processing unit 102 determines the status of the current transmission (TX Status) and the status of the current medium reservation (Medium Reservation Status).

For instance, if the CTS frame is received, the data processing unit 102 concludes that the airtime reservation is provided. Accordingly, the transmission of the DATA frame or DATA fragment that follows the RTS frame is initiated. The reception of the ACK frame indicates to the data processing unit 102 that the transmitted DATA frame or DATA fragment is received by the destination station.

A monitor and adjust unit 112 receives the TX Status and Medium Reservation Status information from the data processing unit 102 and determines dynamically adjusted values of RTS/CTS thresholds and fragmentation threshold. In particular, the unit 112 monitors data transmission to each of n+1 destination addresses in the WLAN to calculate DA(O . . n)_RTS_threshold values and DA(O . . n)_Frag_ threshold values respectively representing dynamically adjusted RTS/CTS and fragmentation thresholds for each destination address in the WLAN.

Via n+1 lines, the DA(O . . n)_RTS_threshold values are transferred to the TX queuing unit 104 for establishing a priority for data transmission and to the TX unit 108 to enable the RTS/CTS exchange mechanism if the length of a DATA frame queued for transmission to a destination address exceeds the adjusted RTS/CTS threshold level for that destination address. As discussed later, a separate RTS/CTS threshold level is determined for each destination address to prevent an out-of-range destination station from creating a false appearance that the WLAN is filled with contending stations. Also, the monitor and adjust unit 102 provides the TX queuing unit 104 and the TX unit 108 with a STA_RTS_threshold value that represents an average adjusted RTS/CTS threshold level for the WLAN as a whole.

The DA(O .. n)_Frag_threshold values calculated by the monitor and adjust unit 112 are supplied via n+1 lines to the TX queuing unit 104 for establishing a priority for data transmission and to the TX fragmentation unit 106 for fragmenting a DATA frame to be transmitted to a destination address if the length of the DATA frame exceeds the adjusted fragmentation threshold level for that destination address. Also, the TX queuing unit 104 and the TX fragmentation unit 106 are provided with a STA_Frag_threshold value that represents an average adjusted fragmentation threshold value for the WLAN as a whole.

Figure 7:
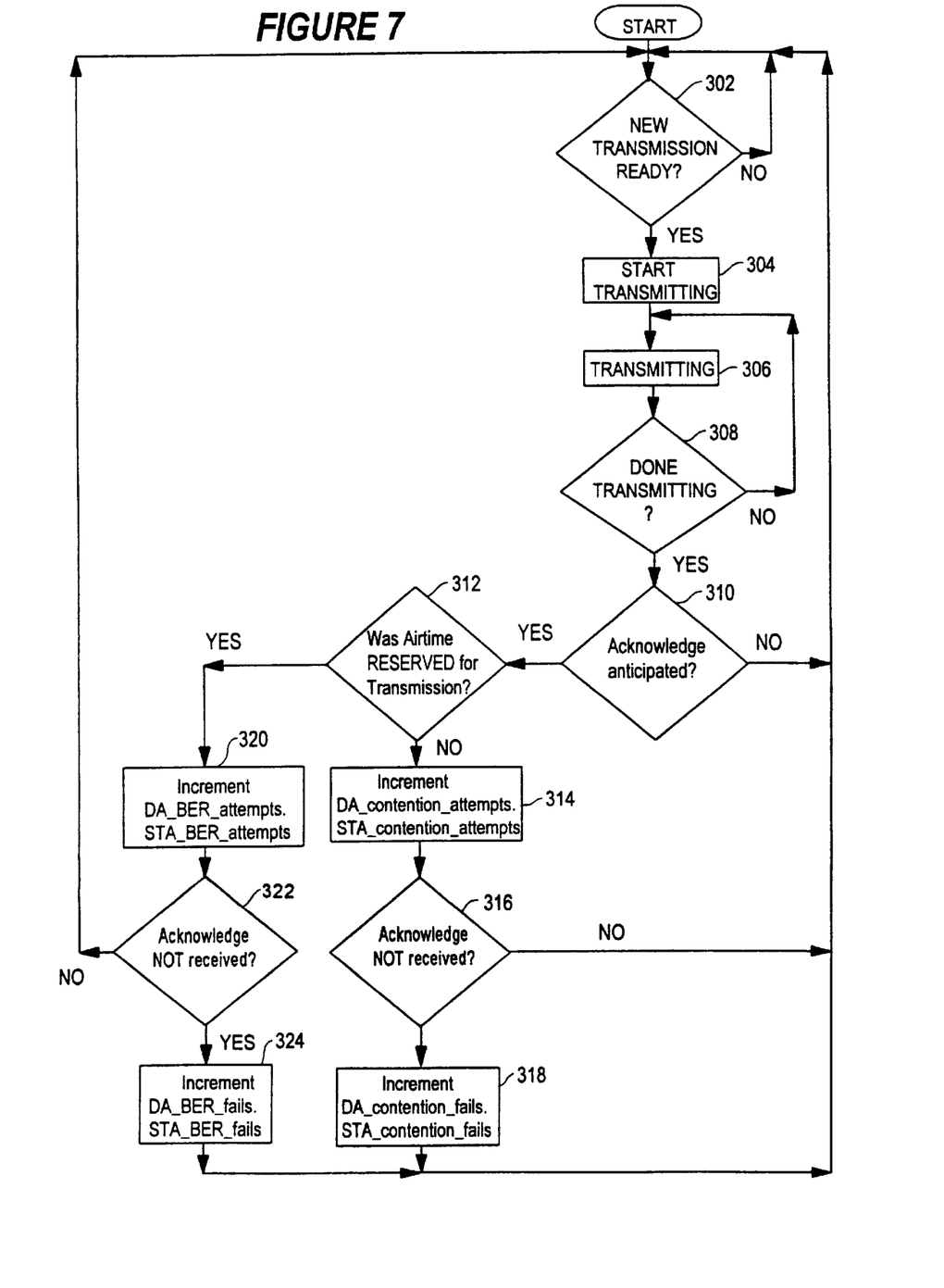
FIG. 7 is a flow chart illustrating operations of the WLAN controller.

The operation of the monitor and adjust unit 112 is as follows. Referring to FIG. 7, for each frame to be transmitted, step 302 is carried out to determine whether the frame is ready for transmission. If so, the transmission of the frame is initiated in step 304 and carried out in step 306.

The monitor and adjust unit 112 checks the TX status information for the transmitted frame to determine whether the transmission is completed (step 308). If the transmission of the frame is completed, the unit 112 determines whether an acknowledgement from the destination station is anticipated (step 310). If not, the monitor and adjust unit 112 goes to monitoring the next frame to be transmitted.

If the acknowledgement is expected, the monitor and adjust unit 112 checks the Medium Reservation Status Information for the transmitted frame to check whether the transmission of this frame was protected by an existing outstanding airtime reservation (step 312). If an RTS or DATA frame was transmitted without an existing outstanding airtime reservation and no CTS or ACK response frame was received, it is highly probable that a collision took place. It is also possible that a noise-induced bit error occurred, however this is less likely due to relatively short sizes of transmitted frames.

Thus, the failure to receive a response frame for transmission attempts unprotected by an airtime reservation may be assumed to be caused by medium contention when two or more stations in the WLAN attempt to transmit data at the same time. Accordingly, the monitor and adjust unit 112 monitors occurrence of transmission attempts unprotected by an airtime reservation, and keeps the number of such attempts as a contention_attempt count. The number of the failures to receive a CTS or ACK frame in response to such attempts is kept as a contention_fails count.

Separate DA_contention_attempts counts may be maintained for each destination address to indicate the number of attempts made to transmit a frame without an airtime reservation to a specific station in the WLAN. Also, the monitor and adjust unit 112 counts the number of failures to receive a CTS or ACK frame from a specific station in response to such unprotected transmission attempts, to maintain separate DA_contention_fails counts for each destination address.

Based on the DA_contention_attempts counts and DA_contention_fails counts, the monitor and adjust unit 112 may calculate the average number of attempts to transmit data without airtime reservation to each station in the WLAN, and the average number of failures to receive a response frame from each station in the WLAN after such unprotected transmission attempts. A STA_contention_attempts count and a STA_contention_failure count are respectively maintained to indicate the average number of the unprotected transmission attempts and the average number of the failures to receive a response frame after the unprotected transmission attempts for the WLAN as a whole.

If step 312 indicates that the frame was transmitted without an existing outstanding airtime reservation, the monitor and adjust unit 112 increments the DA_contention_attempts count for the destination address of the frame, and modifies the STA_contention_attempts count in view of this increment (step 314).

Then, step 316 is carried out to determine whether or not an acknowledgement is not received in response to the transmitted frame. If an acknowledgement is detected, the system returns to step 302 to monitor the next frame to be transmitted. If no ACK or CTS frame is received in response to the transmitted frame, the monitor and adjust unit 112 increments the DA_contention_fails count for the destination address of the frame, and modifies the STA_contention_fails count in view of this increment (step 318).

The number of collisions encountered during the unprotected transmission attempt is an important factor in determining whether or not it is efficient to use the RTS/CTS exchange. The DA_contention_attempts count and DA_contention_fails count produced in steps 314 and 318 are used to estimate the current bandwidth load of the station corresponding to the destination address of the transmitted frame.

A ratio of the DA_contention_fails count incremented in step 318 to the DA_contention_attempts count incremented in step 314 is proportional to an adjustment that should be made to the existing RTS/CTS threshold level for a given destination address to modify it in accordance with the current bandwidth load of the station corresponding to that destination address. Based on this ratio, the monitor and adjust unit 112 adjusts the current RTS/CTS threshold level for the destination address of the transmitted frame and produces an adjusted RTS/CTS threshold level DA(i)_RTS_threshold for that destination address, where $0 \leq i \leq n$, for n+1 destination addresses in the WLAN.

The adjusted DA(i)_RTS_threshold value is supplied to the TX queuing unit 104 for establishing a priority for data transmission and to the TX unit 108 to determine whether or not the RTS/CTS exchange mechanism should be enabled for a given destination address. Accordingly, the RTS/CTS exchange mechanism for frame transmission to each destination address of the WLAN may be dynamically enabled or disabled in accordance with the current bandwidth load of the station corresponding to the destination address.

The STA_contention_attempts count and STA_contention_fails count produced in steps 314 and 318 are used to estimate the current bandwidth load of the WLAN as a whole. A ratio of the STA_contention_fails count to the STA_contention_attempts count may be used to produce the average RTS/CTS threshold level (STA_RTS_threshold) adjusted in accordance with the current bandwidth load of the WLAN. The adjusted STA_RTS_threshold value is supplied to the TX queuing unit 104 and TX unit 108, together with the produced DA(O .. n)_RTS_threshold values for each destination address.

The TX queuing unit 104 may compare each of the DA(O .. n)_RTS_threshold values with the average STA_RTS_threshold value for the WLAN to determine whether the estimated bandwidth load for a given destination address is below or above the average for the WLAN. If the bandwidth load of a destination station is well above the average, the TX queuing unit 104 concludes that the destination station is in a fringe reception area, or out of range of the transmitting station. Accordingly, the priority of frames to be transmitted to this destination station may be reduced compared with the priority of frames to be transmitted to destination stations having a lower estimated bandwidth load. The DA(O . . n) _RTS_thresholds for different destination addresses may be kept in order of their values.

Thus, the frames transmitted to various stations in the WLAN may be dynamically assigned with priorities in accordance with current bandwidth loads of the stations.

Alternatively, the DA_contention_fails and STA_contention_fails counts may be replaced with DA_contention_success and STA_contention_success counts to indicate the number of successful transmission attempts made without an airtime reservation for each destination address and for the WLAN as a whole. In this case, the DA_contention_success count is incremented if an acknowledgement is received.

If the WLAN operates without an RTS/CTS exchange mechanism but employs a data fragmentation scheme, the adjusted RTS/CTS threshold value produced by the monitor and adjust unit 112 may be supplied to the TX fragmentation unit 106 to control data fragmentation.

If a frame is transmitted with an existing outstanding airtime reservation confirmed by a CTS or ACK frame and no ACK frame is received in response to the transmitted frame, a transmitting station may assume that the transmission failure is due to a bit error. The monitor and adjust unit 112 counts the number of transmission attempts (BER_attempts) protected by an existing outstanding airtime reservation for each destination address, and keeps this number as a DA_BER_attempts count. Also, the unit 112 counts the number of failures to receive a response frame from each destination address after the protected frame was transmitted, and keeps this number as a DA_BER_fails count.

The bit error rate for a destination address reflects the signal/noise ratio for the communication path between the transmitting station and the station corresponding to the destination address. As the signal/noise ratio for any given communication path in the WLAN may differ drastically from this ratio for any other communication path in the WLAN, separate DA_BER_attempts and DA_BER_fails counts are maintained for each destination address.

Based on the DA_BER_attempts counts and DA_BER_fails counts, the monitor and adjust unit 112 may calculate the average number of attempts to transmit frames protected by an outstanding airtime reservation to each station in the WLAN, and the average number of failures to receive a response frame from each station in the WLAN after such protected transmission attempts. A STA_BER_attempts count and a STA BER failure count are respectively maintained to indicate the average number of the protected transmission attempts and the average number of the failures to receive a response frame after the protected transmission attempts for the WLAN as a whole.

If step 312 indicates that the frame was transmitted with an existing outstanding airtime reservation, the monitor and adjust unit 112 increments the DA_BER_attempts count for the destination address of the frame, and modifies the STA_BER_attempts count in view of this increment (step 320).

Then, step 322 is carried out to determine whether or not an acknowledgement is not received in response to the transmitted frame. If an acknowledgement is detected, the system returns to step 302 to monitor the next frame to be transmitted. If no ACK frame is received in response to the transmitted frame, the monitor and adjust unit 112 increments the DA BER fails count for the destination address of the frame, and modifies the STA_BER_fails count in view of this increment (step 324). The DA_BER_attempts and DA_BER_fails counts for a given destination address indicate a bit error rate for the propagation path between the transmitting station and the station corresponding to the destination address. This bit error rate provides an estimate of the quality of the propagation path between these stations.

The monitor and adjust unit 112 may calculate a ratio of the DA_BER_fails count incremented in step 324 to the DA_BER_attempts count incremented in step 320 to determine an adjustment that should be made to the existing fragmentation threshold level for a given destination address to modify the fragmentation threshold level in accordance with the current bit error rate between the transmission station and the station corresponding to that destination address. Based on this ratio, the monitor and adjust unit 112 adjusts the current fragmentation threshold level for the destination address of the transmitted frame and produces an adjusted fragmentation threshold level DA(i)_Frag_threshold for that destination address, where $0 \leq i \leq n$, for n+1 destination addresses in the WLAN.

The adjusted DA(i)_Frag_threshold value is supplied to the TX queuing unit 104 for establishing a priority for data transmission and to the TX fragmentation unit 106 to determine whether or not the fragmentation mechanism should be enabled for a given destination address. Accordingly, the fragmentation mechanism for frame transmission to each destination address of the WLAN may be dynamically enabled or disabled in accordance with the current bit error rate between the transmitting station and the station corresponding to the destination address.

The STA_BER_attempts count and STA_BER_fails count produced in steps 320 and 324 are used to estimate the current bit error rate of the WLAN as a whole. A ratio of the STA_contention_fails count to the DA_contention_attempts count may be used to produce the average fragmentation threshold level (STA_Frag_threshold) adjusted in accordance with the current bit error rate of the WLAN. The adjusted STA_BER_threshold value is supplied to the TX queuing unit 104 and TX fragmentation unit 106, together with the produced DA(O . . n)_Frag_threshold values for each destination address.

The TX queuing unit 104 may compare each of the DA(O . . n)_BER_threshold values with the average STA_BER_threshold value for the WLAN to determine whether the estimated bit error rate for a given destination address is below or above the average for the WLAN. If the bit error rate for a destination station is well above the average, the TX queuing unit 104 concludes that the signal/noise ratio for the path between the transmitting station and the destination station is much lower than average. Accordingly, the priority of frames to be transmitted to this destination station may be reduced compared with the priority of frames to be transmitted to destination stations having a higher signal/noise ratio. The DA(O . . n)_Frag_thresholds for different destination addresses may be kept in order of their values.

Thus, the frames transmitted to various stations in the WLAN may be dynamically assigned with priorities in accordance with current bit error rates for the stations.

Alternatively, the DA_BER_fails and STA_BER_fails counts may be replaced with DA_BER_success and STA_BER_success counts to indicate the number of successful transmission attempts made using an airtime reservation for each destination address and for the WLAN as a whole. In this case, the DA_BER_success count is incremented if an acknowledgement is received.

There accordingly has been described a system and method for monitoring performance of a WLAN and dynamically adjusting its operating parameters in accordance with the current conditions. Each station in the WLAN monitors each transmitted frame to determine whether the frame transmission was protected by an existing outstanding airtime reservation. If a frame is transmitted without an airtime reservation and no response frame is received, the station assumes that the transmission failed due to contention, and monitors the number of contention attempts made to transmit each frame, and the number of failures to receive an acknowledgement. Based on this information, the station dynamically adjusts an RTS/CTS threshold used to determine whether or not an RTS/CTS exchange mechanism should be enabled. If a frame is transmitted during a time interval protected by an outstanding airtime reservation and no response frame is received, the station assumes that the transmission failed due to a bit error, and monitors the number of bit error rate (BER) attempts made to transmit each frame, and the number of BER failures to receive an acknowledgement. Based on this information, the station dynamically adjusts a fragmentation threshold used to determine whether or not a data frame fragmentation mechanism should be enabled.

In this disclosure, there are shown and described only the preferred embodiments of the invention, but it is to be understood that the invention is capable of changes and modifications within the scope of the inventive concept as expressed herein.

What is claimed is:

1. A controller for a wireless local area network (WLAN), comprising:

a data processing unit arranged at a transmitting station for supplying frames to be transmitted to a destination station and receiving acknowledgements that the frames are received by the destination station, and a control unit responsive to said data processing unit for monitoring the number of attempts made to transmit each frame and the number of failures to receive an acknowledgement in response to transmission of the frame, to dynamically control transmission of airtime reservation requests sent to the destination station, wherein said control unit is adapted for determining the average number of attempts made to transmit the frames to destination stations and the average number of failures to receive an acknowledgement for the WLAN, to determine deviation of operating conditions for each of the destination stations from average operating conditions for the WLAN.

2. The controller of claim 1, wherein said control unit is responsive to said data processing unit for dynamically controlling fragmentation of data frames sent to the destination station.

3. The controller of claim 2, wherein said control unit is responsive to said data processing unit for determining whether an airtime reservation is provided for transmission of each of the frames.

4. The controller of claim 3, wherein said control unit is adapted for dynamically adjusting a threshold level for transmission of the airtime reservation requests to the destination station based on the number of attempts made to transmit a frame to the destination station and the number of failures to receive an acknowledgement, when the airtime reservation is not provided for transmission of the frame.

5. The controller of claim 3, wherein said control unit is adapted for dynamically adjusting a threshold level for fragmentation of the data frames transmitted to the destination station based on the number of attempts made to transmit a frame to the destination station and the number of failures to receive an acknowledgement, when the airtime reservation is provided for transmission of the frame.

6. The controller of claim 1, further comprising a queuing unit responsive to said control unit for controlling priorities of the frames sent to the destination station in accordance with the deviation of the operating conditions for the destination station from the average operating conditions for the WLAN.

7. A method of dynamically adjusting operating parameters of a WLAN, comprising the steps of:

monitoring transmission of each frame to destination stations in the WLAN, checking whether or not an airtime reservation is obtained for protecting transmission of each frame, monitoring whether an acknowledgement is received in response to each transmitted frame, for each destination address of the WLAN, maintaining a count of contention attempts indicative of the number of attempts to transmit the frame to each destination station when no airtime reservation is available, for each destination address of the WLAN, maintaining a count of contention failures indicative of the number of failures to receive the acknowledgement when no airtime reservation is available, for each destination address of the WLAN, producing an airtime reservation threshold level for transmitting an airtime reservation request before a data frame if a parameter of the data frame exceeds the airtime reservation threshold level, incrementing the count of contention attempts for a first destination address each time when a frame unprotected by the airtime reservation is transmitted to a first destination station corresponding to the first destination address, incrementing the count of contention failures for the first destination address each time when no acknowledgement is received in response to the unprotected frame, and for the first destination address, adjusting the airtime reservation threshold level in accordance with the ratio of the incremented count of contention failures to the incremented count of contention attempts.

8. The method of claim 7, further comprising the steps of:

for each destination address of the WLAN, maintaining a count of protected attempts indicative of the number of attempts to transmit the frame to each destination station when the airtime reservation is available, for each destination address of the WLAN, maintaining a count of protected failures indicative of the number of failures to receive the acknowledgement when the airtime reservation is available, for each destination address of the WLAN, producing a fragmentation threshold level for fragmenting a data frame if a parameter of the data frame exceeds the fragmentation threshold level, incrementing the count of protected attempts for the first destination address each time when a frame protected by the airtime reservation is transmitted to the first destination station corresponding to the first destination address, incrementing the count of protected failures for the first destination address each time when no acknowledgement is received in response to the protected frame, and adjusting the fragmentation threshold level for providing fragmentation of data frames to be transmitted to the first destination station in accordance with the ratio of the incremented count of protected failures to the incremented count of protected attempts.

9. The method of claim 7, further comprising the steps of:

determining an average count of contention attempts and an average count of contention failures for the WLAN, modifying the average counts of contention attempts and contention failures based on the incremented counts of contention attempts and contention failures, and adjusting an average airtime reservation threshold level for the WLAN in accordance with the ratio of the modified average count of contention failures to the modified average count of contention attempts.

10. The method of claim 9, further comprising the step of comparing the adjusted airtime reservation threshold level for the first destination address with the adjusted average airtime reservation threshold level to control priority of a frame to be sent to the first destination station.

11. The method of claim 10, further comprising the steps of:

determining an average count of protected attempts and an average count of protected failures for the WLAN, modifying the average counts of protected attempts and protected failures based on the incremented counts of protected attempts and protected failures, and adjusting an average fragmentation threshold level for the WLAN in accordance with the ratio of the modified average count of protected failures to the modified average count of protected attempts.

12. The method of claim 11, further comprising the step of comparing the adjusted fragmentation threshold level for the first destination address with the adjusted average fragmentation threshold level to control priority of a frame to be sent to the first destination station.

13. A controller for a wireless communication station, comprising:

first means for monitoring transmission of frames to destination stations, second means for determining whether or not an airtime reservation is obtained for protecting transmission of the frames, third means for determining whether acknowledgements are received in response to the transmitted frames, fourth means responsive to said first, second and third means for maintaining a count of protected attempts indicative of the number of attempts to transmit the frames to the destination station when the airtime reservation is available, fifth means responsive to said first, second and third means for maintaining a count of protected failures indicative of the number of failures to receive the acknowledgements when the airtime reservation is available, and first control means responsive to said fourth and fifth means for controlling fragmentation of data to be transmitted to the destination stations.

14. The controller of claim 13, further comprising:

sixth means responsive to said first, second and third means for maintaining a count of unprotected attempts indicative of the number of attempts to transmit the frames to the destination station when no airtime reservation is available, seventh means responsive to said first, second and third means for maintaining a count of unprotected failures indicative of the number of failures to receive the acknowledgements when no airtime reservation is available, and second control means responsive to said sixth and seventh means for enabling airtime reservation requests before transmitting the data to the destination stations.

* * * * *